Figure 1:
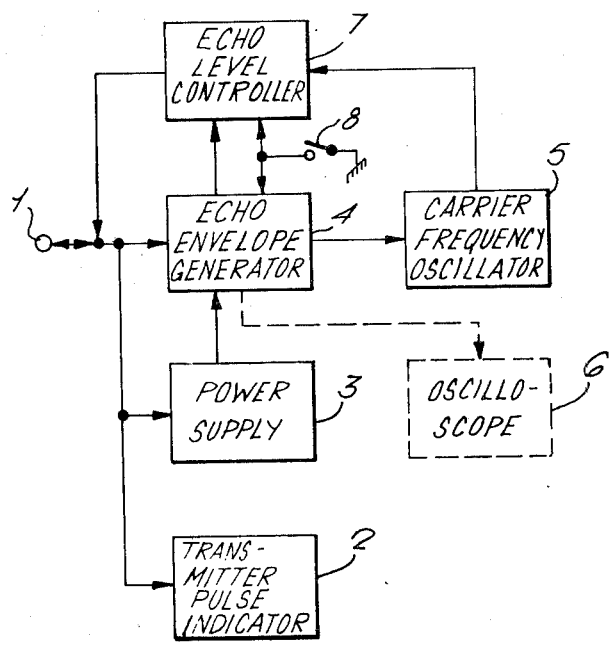

United States Patent [19]
Johannessen

[11] 3,983,530
[45] Sept. 28, 1976

[54] ECHO SIMULATING PROBE

[75] Inventor: Sverre Johannessen, Horten, Norway

[73] Assignee: Simrad A.S., Horten, Norway

[22] Filed: Mar. 7, 1975

[21] Appl. No.: 556,344

[30] Foreign Application Priority Data
Mar. 7, 1974 Norway................................ 801/74

[52] U.S. Cl................................ 340/5 C; 343/17.7
[51] Int. Cl.² ........................................... G01S 7/40
[58] Field of Search............. 340/5 C; 343/17.7, 6.5

[56] References Cited
UNITED STATES PATENTS

| | | | |
|---|---|---|---|
| 2,706,285 | 4/1955 | Scott | 340/5 C X |
| 3,149,284 | 9/1964 | Kishinsky | 343/17.7 X |
| 3,185,985 | 5/1965 | Child et al. | 343/17.7 |
| 3,713,148 | 1/1973 | Cardullo et al. | 343/6.5 R |
| 3,789,352 | 1/1974 | Forsyth | 340/5 C |

*Primary Examiner*—T.H. Tubbesing
*Attorney, Agent, or Firm*—Watson, Cole, Grindle & Watson

[57] ABSTRACT

An echo probe taps power from pulses received at an input/output terminal from a distance measuring system and generates delayed simulated sonar signals at the input/output terminal which have substantially the same frequency as the carrier frequency of the distance measuring system. Control circuitry produces spaced first and second control signals having different characteristics from one another in response to a received pulse from the distance measuring system appearing at the input/output terminal and actuates carrier frequency oscillator circuitry to generate the simulated sonar signals. Circuitry is provided for controlling the delay between the received pulse and the simulated sonar signals and also to determine the pulse widths of the first and second control signals and the spacing therebetween. Level control circuitry regulates the amplitude of the simulated first and second sonar signals. Indicating circuitry provides an indication of the power level of the pulse signal received at the input/output terminal.

12 Claims, 3 Drawing Figures

ECHO SIMULATING PROBE

The present invention relates to a testing instrument for distance measuring systems. The invention is particularly suitable for use with sonar and echo sounder equipment. It may, however, also be used with radar equipment.

When servicing and troubleshooting echo sounder equipment ammeters, voltmeters, ohm-meters, oscilloscopes and signal generators are commonly used. When carrying out service at the situs of the equipment, it may often be difficult and inconvenient to bring along the necessary testing equipment. The present invention has reduced the equipment necessary for servicing in the field. The test probe of the invention indicates the echo sounder transmitter pulse power. The test probe further supplies reference echoes for fish and the sea bottom including different signal levels for the two echo types. The test probe has an output for oscilloscope trigger pulses and a continuous signal may be supplied to the echo sounder receiver for testing the time variable gain (TVG) of the sounder. The echo test probe of the invention also has a built in power supply unit using power from the echo sounder transmitter pulse to feed the electronic circuits required in the test probe.

Figure 2:
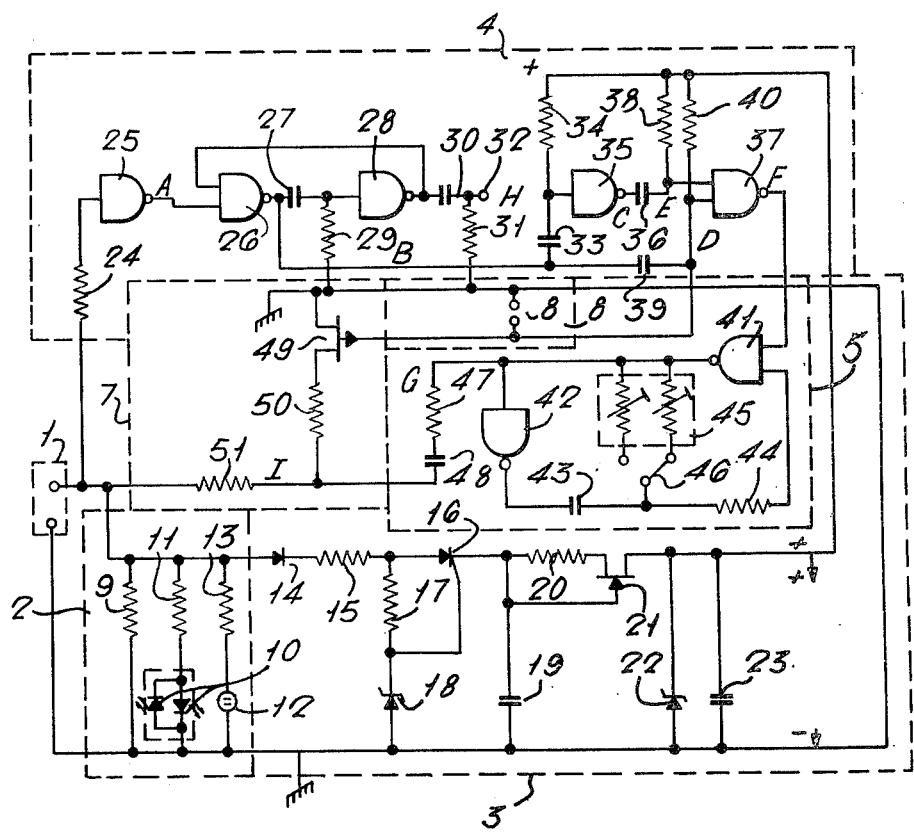

An exemplary embodiment of apparatus embodying the invention is described in the following drawings, wherein:

FIG. 1 is a block diagram of the test echo probe,
FIG. 2 is a detailed circuit diagram thereof, and
FIGS. 3A to 3I are representative signals at different points in the circuit FIG. 2.

FIG. 1 includes an input/output terminal 1 for connecting the probe to the transducer cable terminal of a distance measuring system such as an echo sounder. An echo sounder transmitter pulse arriving at terminal 1 is fed to a transmitter pulse indicator 2 and a power supply unit 3.

The transmitter pulse indicator 2 shows whether the transmitter-pulse is a high or low power pulse, or if it is missing.

The power supply unit 3 taps power from the transmitter pulse. The power is supplied to the active circuits in the rest of the system through echo envelope generator 4.

From the transmitter pulse indicator 2, the transmitter pulse is fed to an echo envelope generator 4 modulating a carrier frequency oscillator 5. The echo envelope generator 4 also has an output for oscilloscope trigger pulses. The oscilloscope 6 is not included in the probe, however. The echo envelope generator 4 normally provides two echoes, one "fish"-echo and one "bottom" or "seabed -echo. The amplitude of the fish-echo and the seabed-echo may be adjusted using an echo level control 7, which is controlled by the echo envelope generator and regulates the amplitude of the output from the carrier frequency oscillator 5.

The carrier frequency oscillator 5 is switched on and off in accordance with signals from the echo envelope generator 4. The output signals from the carrier frequency oscillator 5, are fed back to the input-/output terminal 1 and to the echo sounder receiver input through the transducer connection terminal. The echo probe thus injects artificial echoes into the echo sounder receiver a predetermined length of time after the transmitter pulse has been received.

To check the TVG function of the echo sounder, the echo envelope generator 4 may be manually set to provide a continuous signal using a switch 8. The carrier frequency oscillator 5 will then supply an unmodulated signal to the echo sounder receiver.

Referring now to FIG. 2, a resistor 9 is connected across the input to ensure a minimum load for the echo sounder transmitter. The transmitter pulse indicator 2 consists of light emitting diodes 10 connected to ground in series with resistor 11, and a neon lamp 12 connected to ground in series with resistor 13. The neon lamp 12 indicates high power, and the light emitting diode 10 indicates low power. Should the transmitter pulse be missing, none of the lamps will light up. When an echo sounder with a very high power pulse output is being tested, both the neon lamp 12 and the light emitting diode 10 will light up.

The power supply unit 3 is connected in parallel with the transmitter pulse indicator 2. The transmitter pulse is conducted through a diode 14 and a resistor 15 to a thyristor 16. A resistor 17 and a voltage reference element 18 are connected in series between the anode of the thyristor 16 and ground. The junction between the resistor 17 and the voltage reference 18 is connected to the trigger gate of thyristor 16. Between the cathode of thyristor 16 and ground, a capacitor 19 is connected as an energy storing element. The cathode of thyristor 16 is also connected to a constant current generator consisting of a resistor 20 and a field effect transistor 21. The output from the field effect transistor 21 is the positive terminal of the power supply unit. Finally, a diode 22 and a capacitor 23 are connected between the positive output of the power supply unit 3 and ground.

The operation of the power supply unit 3 is as follows.

The transmitter pulse is rectified by the diode 14. The power is limited by the resistor 15. As long as the voltage across capacitor 19 is less than voltage across the voltage-reference 18, the thyristor 16 will conduct. Thereby capacitor 19 will be charged up by positive half waves of the transmitter pulse until the voltage across the capacitor increases to the point where the thyristor 16 is no longer triggered. The current output from capacitor 19 is limited by the field effect transistor 21, depending on the voltage drop across resistor 20. The voltage from the power supply unit is stabilized by the zener diode 22, and capacitor 23 further limits ripple by providing a small energy reserve. At the same time high frequency voltage components are decoupled to ground.

The echo envelope generator 4 is connected to the input terminal 1 in parallel with the indicator 2 and the power supply unit 3. The input terminal 1 is connected to am inpedance matching resistor 24 in the echo envelope generator. From resistor 24 the transmitter pulse is fed to an inverter 25. The output from the inverter 25 is fed to one input of a two-input NAND gate 26. The output from the NAND gate 26 is connected to a capacitor 27, the other end of which is connected to the input of an inverter 28. A resistor 29 is connected between the input of inverter 28 and ground. The output of inverter 28 is connected to the other input of NAND gate 26. A capacitor 30 and a resistor 31 are connected in series between the output of inverter 28 and ground. The junction between capacitor 30 and resistor 31 are connected to an output terminal 32 for triggering an oscilloscope (not shown).

The output of NAND gate 26 is also connected to a capacitor 33. The capacitor 33 is connected to the positive bus of the power supply through a resistor 34. The junction between the capacitor 33 and the resistor 34 is connected to the input of an inverter 35. The output of the inverter 35 is connected to a capacitor 36, the other end of which is connected to one input of a two-input NAND gate 37. A resistor 38 is connected between the positive bus and the junction between capacitor 36 and the input of NAND gate 37. A capacitor 39 is connected between the other input of NAND gate 37 and the output of NAND gate 26. A resistor 40 is connected between the positive bus and the junction between capacitor 39 and the input of NAND gate 37. The junction between capacitor 39 and NAND gate 39 may be grounded using switch 8. The junction between capasitor 39 and NAND gate 37 is also connected to the input of echo level controller 7.

The echo envelope generator 4 operates as follows.

Figure 3:
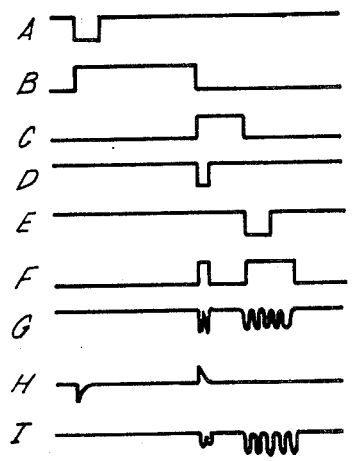

With reference to FIG. 3 the transmitter pulse arrives at inverter 25 and the output A goes low. When the output of inverter 25 goes low, the output B of NAND gate 26 goes high. The RC-network consisting of resistor 29 and capacitor 27 sets the input of inverter 28 high and keeps the input high for a period of time determined by the time constant of the RC-network. As long as the input of inverter 28 is high, the output is low and the output of NAND gate 26 is kept high independent of the length of the transmitter pulse. When the output of inverter 28 goes low, a negative trigger pulse is fed to the oscilloscope output terminal 32. The pulse width is determined by capacitor 30 and resistor 31. The width of pulse B determines the distance between the transmitter pulse and the fish-echo, in other words the depth to the fish on the echo sounder. When the output of inverter 28 returns to its high level, a positive pulse is fed to the output terminal 32. This pulse may be used for triggering the oscilloscope at a fish-echo. The oscilloscope trigger pulses are shown in FIG. 3H. The transmitter pulse is a negative trigger pulse, and the fish-echo is a positive trigger pulse to the oscilloscope. The echo-signals may then easily located and identified on the scope.

When signal B which determines the depth to the fish-echo, goes negative signal D goes negative. The duration of signal D is governed by resistor 40 and capacitor 39. The duration of signal D determines the width of the fish-echo on the recording. When signal D goes negative, the output F of NAND gate 37 goes positive and provides the envelope of the fish echo.

The input of inverter 35 goes negative at the same time as signal B. The input of inverter 35 is low for a period of time given by the time constant of resistor 34 and capacitor 33. This time period represents the distance between the fish and the bottom. The output C of inverter 35 is then positive. When the output C goes low, the corresponding input of NAND gate 37 goes low for a time period determined by resistor 38 and capacitor 36. During this time the output F of NAND gate 37 is high. This is the second pulse, the seabed or bottom echo, in FIG. 3F. The width of the bottom echo is given by the time constant of resistor 38 and capacitor 36.

The junction between capacitor 39 and resistor 40 is, as mentioned before, also connected to the echo amplitude controller 7 to keep the amplitude of fish echoes lower than the amplitude of bottom echoes.

When testing the TVG-function of the echo sounder, the junction between the capacitor 39 and the resistor 40 is grounded by means of switch 8. The output F from NAND gate 37 becomes a continuous high signal and the amplitude controller 7 is controlled to provide a signal from the echo probe with the same amplitude as that of fish-echoes.

The carrier frequency oscillator 5 is connected to the output of echo envelope generator 4. The input of carrier frequency oscillator 5 is connected to a two input NAND gate 41. An input of NAND gate 41 is connected to the output of NAND gate 37 in the echo envelope generator 4. The output of NAND gate 41 is connected to the input of inverter 42. The output of inverter 42 is fed back to the second input of NAND gate 41 through a series connection of a capacitor 43 and a resistor 44. The junction between the NAND gate 41 and the input of inverter 42 is connected to the junction between capacitor 43 and resistor 44 through one of several presetable resistors 45 by means of a selector 46.

Components 41–46 constitute an oscillator the frequency of which may be selected by means of switch 46 by connecting the corresponding resistor 45 to the junction between capacitor 43 and resistor 44.

The output from oscillator 5 is fed through a resistor 47 and a capacitor 48 to the junction of resistor 50 and 51 in echo level controller 7.

The oscillator 5 is gated "on" when the output of echo envelope generator 4 goes high, i.e. when the output is the envelope of an echo. Normally the input of NAND gate 41 is low, and the output of NAND gate 41 is high. The input of inverter 42 is then high, and the output is low. The other input of NAND gate 41 stays high. When the output of echo envelope generator 4 then goes high, the output of NAND gate 41 goes low and the output of inverter 42 goes high. As capacitor 43 is discharged through the selected one of resistors 45, the voltage across the other input of NAND gate 41 drops until the threshold level representing a low input is reached. The output of NAND gate 41 goes high and the output of inverter 42 goes low. Capacitor 43 is then charged up through the selected resistor 45, and the other input of NAND gate 41 goes high. The output of NAND gate 41 thereby goes low, and the output of the inverter 42 goes high.

The output state of NAND gate 41 will alternate between high and low as long as the signal from the echo envelope generator 4 is high. The oscillator frequency is determined by capacitor 43 and the selected one of resistors 45. The output from oscillator 45 is shown in FIG. 3G.

The echo amplitude controller 7 is connected between the output of the carrier frequency oscillator 5 and the input/output terminal 1. The echo amplitude controller 7 is a field effect transistor 49 connected to ground in series with a resistor 50. The output signal from the echo amplitude controller 7 is scaled down through a matching resistor 51.

The echo amplitude controller 7 reduces the amplitude of output signal G by conducting part of the signal to ground through resistor 50 and the field-effect transistor 49. The field effect transistor 49, which normally has a very high resistance, conducts when the gate goes low. As shown in FIG. 2, this happens when signal D, which controls the fish echo, goes low. Alternatively the gate of transistor 49 is grounded through switch 8.

At the same time NAND gate 37 in the echo envelope generator 4 provides a continuous high output.

Although the probe has been described for servicing conventional echo sounders, it may easily be adapted for use on frequency modulated equipment or equipment with coded transmitter pulses of different kinds. A corresponding probe for use when testing radars is also within the scope of the invention, as is a modified version for testing pulsed doppler logs.

I claim:

1. An echo probe for providing simulated sonar signals to test distance measuring systems measuring lapsed time between transmitted anad reflected pulses, comprising:
    input/output terminal means adapted to be connected to the distance measuring equipment;
    control means for producing a control signal in response to a received pulse at said input/output terminal means, said control signal including spaced first and second control signals, said first and second control signals having different characteristics from one another;
    power supply means for tapping power from the pulses received at said input/output terminal means and connected to said control means; and
    carrier frequency oscillator means responsive to said first and second control signals for generating simulated first and second sonar signals at said input/output terminal means and having substantially the same frequency as the carrier frequency of said distance measuring system.

2. An echo probe as in claim 1 wherein said power supply means includes a controllable gating element connected to receive at least part of said received pulse, means for storing the output of said controllable gating element, and means for biasing the gate of said controllable gating element at a fixed reference voltage.

3. An echo probe as in claim 2 wherein said power supply means further includes means for rectifying connected between said controllable gating element and said input/output terminal means, and means for generating a substantially constant current and means for providing a substantially constant voltage from said means for storing to said control means.

4. An echo probe as in claim 3 wherein said power supply means further includes means for smoothing the output thereof and for decoupling high frequency voltage components to ground.

5. An echo probe as in claim 2 wherein said carrier frequency oscillator means includes means for varying the frequency of said simulated sonar signals.

6. An echo probe as in claim 1 wherein said control means includes means for generating a delay control signal having a duration independent of the pulse width of the signal received at said input/output terminal means, said pulse width representing the delay between the pulse received at said input/output terminal means and said first control signal, and means responsive to said delay control signal for generating trigger pulse outputs at the initiation and termination thereof for controlling monitoring apparatus.

7. An echo probe as in claim 6 wherein said control means further includes means for independently determining the pulse widths of said first and second control signals and means for determining the spacing between said first and second control signals.

8. An echo probe as in claim 1 further comprising level control means for controlling the amplitude of said simulated first and second sonar signals and having an output connected to said input/output terminal means.

9. An echo probe as in claim 8 wherein said level control means further includes means for providing a constant amplitude output from said carrier frequency oscillator means to said input/output terminal means.

10. An echo probe as in claim 1 further comprising indicating means connected to said input/output terminal means for indicating the power level of a pulse signal at said input/output terminal means.

11. An echo probe as in claim 10 wherein said indicating means includes means for indicating different power levels of a pulse signal at said input/output terminal means.

12. An echo probe as in claim 1 further comprising level control means for controlling the amplitude of said simulated first and second sonar signals and having an output connected to said input/output terminal means; and indicating means connected to said input/output terminal means for indicating the power level of a pulse signal at said input/output terminal means.

* * * * *